United States Patent Office 3,470,128
Patented Sept. 30, 1969

3,470,128
CURABLE FILLED EPOXY RESIN MIXTURES
Otto Ernst, Pfeffingen, Ulrich Niklaus, Basel, and Hans Batzer, Arlesheim, Switzerland, assignors to Ciba Limited, Basel, Switzerland, a company of Switzerland
No Drawing. Filed Nov. 22, 1966, Ser. No. 596,068
Claims priority, application Switzerland, Nov. 23, 1965, 16,130/65
Int. Cl. C08g 45/06
U.S. Cl. 260—37          4 Claims

ABSTRACT OF THE DISCLOSURE

Curable resin mixtures which contain as the resin component either an epoxy resin containing carbocyclic aromatic rings and a curing agent for epoxy resins or a pre-condensate from such an epoxy resin and a curing agent, as well as fillers, characterized in that the filler consists at least partially of a nitrogenous compound from the groups of the triazine derivatives, urea, guanidine and derivatives thereof, the said nitrogenous compound having a molecular weight not exceeding 1000, having a melting point over 120° C. and not being appreciably soluble in the resin component at 120° C., and the said nitrogenous compound being present in the mixture in an amount of at least 40 parts by weight, preferably of over 50 up to 400 parts by weight, for every 100 parts by weight of epoxy resin and are particularly useful as casting compositions, particularly for use in the electrical industry. They are also suitable as laminating compositions, molding compositions, coating compositions and the like.

---

It is known to use fillers in castings from casting resin, whereby in many cases the properties of the casting are significantly changed. Thus, it is possible to improve the mechanical properties and, for example, enhance the heat distortion characteristics according to Martens, and quite generally to reduce the cost of the casting resin composition. Another not inconsiderable advantage is the diminished shrinkage experienced in curing the casting resin composition and the less pronounced exothermic reaction. However, most of the known fillers have distinct disadvantages. For example, the abrasive effect associated with the inorganic fillers most frequently used by industry and the increase in the specific gravity of the castings are disadvantageous. Above all, the use of resins extended by means of fillers in the electrical industry is limited by their unsatisfactory stability towards leakage currents and electric arcs, as well as by the generally very substantial increase in the dielectric losses. The use of, for example, quartz meal, as filler causes a distinct impairment of the good electrical properties of epoxy casting resins.

To overcome the above-mentioned disadvantages it has already been proposed to use as fillers for epoxy resins alumina trihydrate, alkaline earth metal carbonates (German Patent 1,189,277 of June 7, 1962 to Licentia Patent-Verwaltungs-G.m.b.H., Frankfurt), alkaline earth metal sulphates (French Patent 1,267,518 of Sept. 14, 1960, to Siemens-Schuckertwerke Aktiengesellschaft, Berlin and Erlangen) or alkaline earth metal oxalates (German Patent 1,129,694 of Aug. 17, 1960 to Siemens-Schuckertwerke Aktiengesellschaft, Berlin and Erlangen). While this expedient makes accessible castings that are stable towards leakage currents and in some cases also to electric arcs, the dielectric loss angle tg δ is not reduced. On the contrary, this angle is higher than with unfilled casting resin compositions or, for an equal loss angle, the electric arc resistance is insufficient, as is the case with ground chalk. The said fillers based on oxalates are, moreover, thermally objectionable because such compounds may decompose at relatively low temperatures. There are also known electrical insulators having a protective coating from material that is stable towards leakage currents; with such components there is however a considerable risk of the mechanical or chemical bond between coating and base being insufficient, which may cause an increased risk of electric breakdowns. Finally, German Patent 1,137,209 of Aug. 19, 1960 to Norddeutsche Kabelwerke Aktiengesellschaft, Berlin-Neukolln, has disclosed a process for the manufacture of castings by hotcuring casting compositions filled with polyethylene or polypropylene. However, when polyethylene or polypropylene are used as fillers there are obtained castings that do not possess satisfactory mechanical properties and are not sufficiently stable towards electric arcs.

When the resin component used is an epoxy resin containing carbocyclic aromatic rings, the above-mentioned disadvantages can be completely or at least substantially overcome and a particularly good arc stability and a low dielectric loss can be achieved by using as fillers certain triazine derivatives, urea, guanidine or derivatives thereof having a molecular weight not exceeding 1000, a melting point above 120° C., and not being appreciably soluble in the resin component at 120° C., this filler being used in an amount of at least 40 parts by weight per 100 parts by weight of epoxy resin. Particularly suitable as such fillers are melamine, cyanuric acid and dicyandiamide.

Compared with polyethylene and polypropylene the castings containing fillers of this invention display a distinctly improved behaviour towards the electric arc and possess better mechanical properties.

It is another advantage of the nitrogenous fillers of this invention that even a relatively small addition thereof to electrically less suitable fillers, such as quartz meal, produces a substantial improvement.

It is in fact already known from German Patent 947,632 of Dec. 29, 1948 to Ciba Aktiengesellschaft Basel and from Swiss Patent 257,115 of Aug. 3, 1946 to Ciba Aktiengesellschaft Basel to use as curing agents for epoxy resins (prepared by reacting bisphenol A with epichloro-hydrin) triazine derivatives, such as melamine or cyanuric acid or dicyandiamide respectively. In this known use as curing agent there are employed as curing agent per 100 parts by weight of epoxy resin 10 to at most 35 parts by weight of melamine and/or cyanuric acid or 2 to at most 20 parts by weight of dicyandiamide respectively, substantially all of the triazine derivative or of the dicyandiamide reacting with the epoxy resin during curing, and none of the unreacted filler remaining in the cured product.

Furthermore, in German Auslegeschrift No. 1,115,291 of Aug. 26, 1959 to Licentia Patent-Verwaltungs-G.m.b.H., Frankfurt it has been further proposed to add to a casting resin mixture containing a triazine epoxy resin, an amine curing agent and an aliphatic diglycidyl ether, as a gas donor having a flame-inhibiting action up to 50% of melamine, referred to the weight of the whole resin. Since casting resin mixtures based on triazine epoxy resin have even without modifying additions excellent electrical properties, especially good stability towards leakage currents and good arc resistance, an addition of melamine in this case would not produce an improvement in these electrical properties.

On the other hand, in the case of casting resin mixtures based on epoxy resins containing carbocyclic aromatic rings, especially polyglycidyl ethers of polyphenols—which as such have a relatively poor stability to leakage currents and electric arcs—an addition of about 40 to 400 parts by weight of triazine derivative for every 100 parts of epoxy resin surprisingly produces a substantial improvement in the electrical properties mentioned.

Accordingly, the present invention provides curable resin mixtures which contain as the resin component either an epoxy resin containing carbocyclic aromatic rings and a curing agent for epoxy resins or a pre-condensate from such an epoxy resin and a curing agent, as well as fillers, characterized in that the filler consists at least partially of a nitrogenous compound from the groups of the triazine derivatives, urea, guanidine and derivatives thereof, the said nitrogenous compound having a molecular weight not exceeding 1000, having a melting point over 120° C. and not being appreciably soluble in the resin component at 120° C., and the said nitrogenous compound being present in the mixture in an amount of at least 40 parts by weight, preferably of over 50 up to 400 parts by weight, for every 100 parts by weight of epoxy resin.

The term "curing" as used in this context indicates the conversion of the above-mentioned resin systems into insoluble and infusible cross-linked products, in general with simultaneous shaping to furnish shaped products, such as castings, mouldings or laminates, or flat structures, such as lacquer films or cemented products.

Triazine derivatives suitable for use as fillers according to this invention are, for example, ammeline, ammelide, melam, formaguanamine, acetoguanamine, benzoguanamine, mono-alkyl-melamines, N-phenylmelamine, mono-, di-, tri-, tetra-, penta- and hexa-methylolmelamines, tetrahydrobenzoguanamine, hexahydrobenzoguanamine and especially cyanuric acid and melamine.

Apart from urea and guanidine itself there may be used as fillers also their salts, for example guanidine carbonate. Good results are obtained especially with derivatives of guanidine, and among them above all with dicyandiamide (=1-cyanoguanidine).

The epoxy resins to be used according to this invention are polyepoxy compounds containing carbocyclic aromatic rings; as examples there may be mentioned:

The polyepoxides obtained by epoxidation with peracids, such as peracetic acid, of unsaturated adducts of at least 2 mols of a diene such as butadinene or isoprene with aromatic hydrocarbons such as benzene, toluene or xylene; basic polyepoxy compounds obtained by reacting primary or second aromatic diamines, such as aniline, toluidine, 4,4'-diaminodiphenylmethane, 4,4'-di-(monomethylamino)-diphenylmethane or 4,4'-diaminodiphenylsulphone with epichlorohydrin in the presence of alkali; polyglycidyl ethers of N-(dialkanol)arylamines such, for example, as the diglycidyl ether of N-phenyldiethanolamine; polyglycidyl esters obtained by reacting an aromatic dicarboxylic acid, such as phthalic or terephthalic acid, with epichlorohydrin or dichlorohydrin in the presence of alkali, for example diglycidyl phthalate.

Preferred use is made of polyglycidyl ethers obtained by etherifying a dihydric or polyhydric phenol with epicholorohydrin or dichlorohydrin in the presence of alkali. These compounds may be derived from mononuclear or polynuclear diphenols or polyphenols such as resorcinol, pyrocatechol, hydroquinone, 1,4-dihydroxynaphthalene, phenol-formaldehyde condensation products of the resole or novolak type, bis(para-hydroxyphenyl)methane, bis-(para - hydroxyphenyl)methylphenylmethane, bis(para-hydroxyphenyl)tolylmethane, 4,4'-dihydroxydiphenyl, bis-(para-hydroxyphenyl)sulphone and especially from bis-(para-hydroxyphenyl)dimethylmethane (=bisphenol A).

Special mention deserve the polyglycidyl ethers of bis-(para-hydroxyphenyl)dimethylmethane corresponding to the average formula There may also be used mixtures of two or more of the epoxy resins listed above.

For the curable epoxy resin systems there may be used in principle any known type of curing agent, for example amines or amides such as aliphatic and aromatic primary and secondary amines, for instance para-phenylenediamine, bis(para-aminophenyl)methane, ethylenediamine, N,N-diethylethylenediamine, diethylenetriamine, tetra-(hydroxyethyl)diethylenetriamine, triethylenetetramine, N,N-dimethylpropylenediamine; polyamides, for example those from aliphatic polyamines and dimerized or trimerized unsaturated fatty acids; polyhydric phenols, for example resorcinol, bis(4-hydroxyphenyl)dimethylmethane, phenol-formaldehyde resins, or especially polybasic carboxylic acids and their anhydrides, for example phthalic anhydride, tetrahydrophthalic anhydride, hexahydrophthalic anhydride, methylhexahydrophthalic anhydride, endomethylene - tetrahydrophthalic anhydride, methylendomethylene - tetrahydrophthalic anhydride (methyl nadic anhydride), hexachloro-endomethylene-tetrahydrophthalic anhydride, succinic anhydride, adipic anhydride, maleic anhydride, allylsuccinic anhydride, dodecenylsuccinic anhydride, 7-allyl-bicyclo(2.2.1)hept-5-ene-2,3-dicarboxylic anhydride; pyromellitic dianhydride or mixtures of such anhydrides. If desired, there may be additionally used curing accelerators, such as tertiary amines, their salts or quaternary ammonium compounds, for example tris(dimethylaminomethyl)phenol, benzyldimethylamine or benzyl dimethyl ammoniumphenolate, tin (II) salts of carboxylic acids such as tin (II) octoate or alkali metal alcoholates, for example sodium hexylate.

Further suitable as curing agents for the curable epoxy resin systems are catalytic curing agents that cause polymerization of the epoxy resins, for example tertiary amines such as benzyldimethylamine, Mannich's bases such as tris(dimethyl) aminomethylphenol, reaction products of aluminium alcoholates or phenolates with compounds of tautomeric reaction of the acetoacetic ester type, Friedel-Crafts catalysts, for example $AlCl_3$, $SbCl_5$, $SnCl_4$, $ZnCl_2$, $BF_3$ and their complexes with organic compounds such for instance as $BF_3$-amine complexes, metal fluoroborates such as zinc fluoborate; phosphoric acid; boroxines such as trimethoxyboroxine; metal chelate compounds.

Instead of such epoxy resin-curing agent systems there may be used still soluble and fusible, so-called B stages prepared by precondensation of the epoxy resin with a suitable curing agent, for example an aromatic polyamine, such as para,para'-diaminodiphenylmethane or meta-phenylenediamine or a carboxylic acid anhydride such as phthalic anhydride.

The curable systems based on epoxy resins may further contain suitable plasticizers such as dibutylphthalate, dioctylphthalate or tricresylphosphate, inert diluents or so-called active diluents such as, especially, monoepoxides for example butylglycide or cresylglycide.

It is, of course, also possible to incorporate with the curable resin systems to be used according to this invention further conventional additives such as mould lubricants, anti-ageing agents, flame-inhibitors, dyestuffs or pigments.

The amount of triazine derivative, urea, guanidine or their derivatives added must be at least 40 parts by weight for every 100 parts by weight of epoxy resin. Preferably there are used more than 50 parts and up to 400 parts by weight of nitrogenous filler for every 100 parts by weight of epoxy resin.

When a part of the epoxy resin containing carbocyclic aromatic rings is replaced by another epoxy resin, the amount of nitrogenous filler to be added as directed above

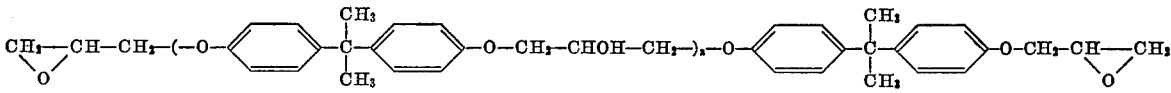

where $z$ is a small, whole or fractional number from 0 to 2.

is calculated from the total weight of the epoxy resin components.

Apart from the new nitrogenous fillers the curable resin mixtures of this invention may contain other known fillers and/or reinforcing agents, for example glass fibres, mica, quartz meal, cellulose, kaolin, ground dolomite, colloidal silica having a large specific surface (Aerosil) or metal powders such as aluminium powder.

The resin mixtures filled according to this invention are mainly used in the casting resin sector. The resulting castings may be used in a wide variety of structural elements, especially in the electrical industry, especially for instance as high-voltage switches, pin-type and suspension insulators (also on overhead lines), and for insulating components in electrical switchgear such as load shedding switches and quenching chambers, also for ducts and in the construction of voltage and current transformers. The curable resin mixtures are, however, also very suitable for use in other sectors, for instance as laminating resins, bonding agents, moulding compositions, sinter powders, coating compositions, sealing compounds, putties, impregnating and dipping resins.

Unless otherwise indicated, parts and percentages in the following examples are by weight. The relationship between part by volume and part by weight is the same as that between the millilitre and the gram.

EXAMPLE 1

The amounts of curing agent shown in the following table are stirred at room temperature in 100 parts each of the polyglycidyl ether resin which is liquid at room temperature (epoxy resin A) [containing 5.4 epoxide equivalent per kg.; viscosity 10,000 centipoises at 25° C.; obtained by reacting epichlorohydrin with bis (4-hydroxyphenyl)dimethylmethane in the presence of alkali], namely 6 parts of tris (dimethylaminomethyl)phenol and 11 parts of triethylenetetramine respectively. In specimens 3 to 8 the indicated amounts of filler are incorporated likewise at room temperature and then specimens 1 to 8 are poured into aluminium moulds (40 x 10 x 140 mm.; 130 x 130 x 2 mm.; 130 x 130 x 4 mm.) and cured for 24 hours at 40° C. to form solid, infusible castings.

With a similar heat distortion characteristic according to Martens and without an appreciable loss in mechanical properties the cured specimens 4 to 8 of this invention display the highest stability towards electric arcs (stage 4), whereas the unfilled cured specimens and the specimen 3 (filled with quartz meal, a filler frequently used by industry; marketed under the trade name "Quartzmehl K8") reach only stage 1. Compared with the cured specimen filled with quartz meal the cured specimens according to this invention display moreover much smaller dielectric losses depending on the temperature.

| Specimen | 1 | 2 | 3 | 4 | 5 | 6 | 7 | 8 |
|---|---|---|---|---|---|---|---|---|
| Epoxy resin A | 100 | 100 | 100 | 100 | 100 | 100 | 100 | 100 |
| Tris(dimethylaminomethyl)phenol | 6 | | | | | 6 | | 6 |
| Triethylenetetramine | | 11 | 11 | 11 | 11 | | 11 | |
| Quartzmehl K8 | | | 100 | | | | | |
| Urea | | | | 50 | | | | |
| Guanidine carbonate | | | | | 50 | | | |
| Dicyandiamide | | | | | | 50 | | |
| Melamine | | | | | | | 60 | |
| Cyanuric acid | | | | | | | | 50 |
| Heat distortion point acdg. to Martens in ° C. (DIN 53458) | 88 | 91 | 85 | 83 | 73 | 100 | 85 | 75 |
| Electric arc resistance DIN 53484 (stage) | L1 | L1 | L1 | L4 | L4 | L4 | L4 | L4 |
| Dielectric loss factor tg δ VDE 0303 (50 c.p.s.) in percent at— | | | | | | | | |
| 20° C | 0.4 | 0.4 | 2.3 | 1.0 | 0.5 | 0.5 | 0.4 | 0.3 |
| 50° C | 0.6 | 0.8 | 3.8 | 2.0 | 1.2 | 0.7 | 0.7 | 0.4 |

EXAMPLE 2

The procedure is as described in Example 1, except that as curing agent hexahydrophthalic anhydride and as curing accelerator benzyldimethylamine are used; the working temperature is 80° C. The casting resin mixtures formulated as shown in the following table are each cured for 4 hours at 120° C. Whereas the mechanical and thermal properties of all cured specimens are of the same order of magnitude, the more favourable behaviour of the cured specimens 4–8 according to this invention in the electric arc and in the dielectric field is striking.

| Specimen | 1 | 2 | 3 | 4 | 5 | 6 | 7 | 8 |
|---|---|---|---|---|---|---|---|---|
| Epoxy resin A | 100 | 100 | 100 | 100 | 100 | 100 | 100 | 100 |
| Hexahydrophthalic anhydride | 80 | 80 | 80 | 80 | 80 | 80 | 80 | 80 |
| Benzyldimethylamine | 0.5 | 0.5 | 0.5 | 0.5 | 0.5 | 0.5 | 0.5 | 0.5 |
| Quartzmehl K8 | | 350 | | | | | | |
| Alumina trihydrate | | | 300 | | | | | |
| Melamine | | | | 200 | | | | |
| Formaguanamine | | | | | 120 | | | |
| Acetoguanamine | | | | | | 175 | | |
| Benzoguanamine | | | | | | | 175 | |
| Cyanuric acid | | | | | | | | 200 |
| Arc resistance DIN 53484 (stage) | L1 | L1 | L4 | L4 | L4 | L4 | L4 | L4 |
| Dielectric loss factor tg δ VDE 0303 (50 c.p.s.) in percent at— | | | | | | | | |
| 20° C | 0.3 | 3.0 | 5.0 | 0.3 | 0.3 | 0.3 | 0.3 | 0.3 |
| 80° C | 0.4 | 5.6 | >10 | 0.6 | 0.4 | 1.5 | 0.7 | 0.3 |

EXAMPLE 3

30 parts each of phthalic anhydride as curing agent are dissolved at 120° to 130° C. in 100 parts each of a polyglycidyl ether resin which is solid at room temperature (epoxy resin B) [containing 2.6 epoxide equivalents per kg.; obtained by reacting epichlorohydrin with bis(4-hydroxyphenyl)dimethylmethane in the presence of alkali). In test 1 no filler is added to this casting resin mixture; in test 2 200 parts of quartz meal (marketed under the trade name "Quartzmehl K8"), in test 3 200 parts of alumina hydrate and in the test 4 (according to this invention) 100 parts of melamine are admixed. The filled specimens have comparable casting properties. The specimens are poured at 120° to 130° C. into the moulds described in Example 1 and all are then cured for 24 hours at 130° C.

Again, the cured specimen 4 according to this invention displays the best arc resistance (stage 4) and at the same time a very low dielectric loss factor.

| Specimen | 1 | 2 | 3 | 4 |
|---|---|---|---|---|
| Epoxy resin B | 100 | 100 | 100 | 100 |
| Phthalic anhydride | 30 | 30 | 30 | 30 |
| Quartzmehl K8 | | 200 | | |
| Alumina trihydrate | | | 200 | |
| Melamine | | | | 100 |
| Heat distortion point accdg. to Martens in ° C. DIN 53458 | 94 | 110 | 105 | 106 |
| Arc resistance DIN 53484 (stage) | L1 | L1 | L4 | L4 |
| Dielectric loss factor tgδ (50 c.p.s.) in percent at— | | | | |
| 20° C | 0.3 | 2.0 | 8.5 | 0.3 |
| 80° C | 0.5 | 4.3 | >10 | 0.5 |

EXAMPLE 4

80 parts each of hexahydrophthalic anhydride and 0.5 part of the curing accelerator benzyldimethylamine are dissolved at 120° to 130° C. in 100 parts each of a polyglycidyl ether resin solid at room temperature (epoxy resin C) [containing 5.5 epoxide equivalents per kg.; prepared by reacting epichlorohydrin in the presence of an alkali with a novolak which itself has been obtained by reacting phenol with formaldehyde at the molecular ratio of 1:0.83 in a weakly acid medium at an elevated temperature]. The amounts of fillers shown in the following table are stirred in and the casting resin mixtures poured into aluminium molds and cured for 24 hours at 130° C. The cured specimens 4 and 5 according to this invention have an equal heat stability, comparable mechanical strength properties but substantially better electrical properties.

| Specimen | 1 | 2 | 3 | 4 | 5 |
|---|---|---|---|---|---|
| Epoxy resin C | 100 | 100 | 100 | 100 | 100 |
| Hexahydrophthalic anhydride | 80 | 80 | 80 | 80 | 80 |
| Benzyldimethylamine | 0.5 | 0.5 | 0.5 | 0.5 | 0.5 |
| Quartzmehl K8 | | 250 | | | |
| Alumina hydrate | | | 250 | | |
| Melamine | | | | 150 | |
| Cyanuric acid | | | | | 150 |
| Flexural strength (kg./mm.²) VSM 77103 | 8.3 | 8.4 | 7.3 | 5.3 | 4.5 |
| Deflection on fracture, mm | 3.5 | 1.8 | 2.1 | 2.1 | 1.6 |
| Impact strength (cm.kg./cm.²) VSM 77105 | 3.8 | 3.6 | 2.1 | 2.3 | 1.7 |
| Heat distortion point accdg. to Martens, in ° C. DIN 53458 | 137 | 156 | 158 | 154 | 155 |
| Leakage resistance VDE 0303 (stage) | KA₁ | KA₁ | KA₁ | KA₂ | KA₁ᵦ |
| Arc resistance DIN 53484 (stage) | L1 | L1 | L1 | L4 | L4 |
| Dielectric loss factor tgδ VDE 0303 (50 c.p.s.) in percent at— | | | | | |
| 20° C | 0.5 | 2.5 | 2.0 | 0.5 | 0.5 |
| 80° C | 0.3 | 5.1 | 9.8 | 0.3 | 0.3 |
| 140° C | 0.8 | 5.8 | | 0.6 | 0.7 |

EXAMPLE 5

100 parts each of a polyglycidyl ester resin which is liquid at room temperature (epoxy resin D) [containing 6.3 epoxide equivalents per kg.; obtained by reacting phthalic acid with epichlorohydrin in the presence of a quaternary ammonium compound, followed by dehydrohalogenation with NaOH solution are admixed at 120° C. with 80 parts of the curing agent phthalic anhydride; in test 1 300 parts of Quartzmehl K8, in test 2 130 parts of cyanuric acid are added, and the mixtures are cured in aluminium moulds for 16 hours at 120° C.

Both specimens display in the cured state the highest stage of arc resistance (L4), but the specimen 2 according to this invention reveals in addition very low dielectric losses.

| Specimen | 1 | 2 |
|---|---|---|
| Epoxy resin D | 100 | 100 |
| Phthalic anhydride | 80 | 80 |
| Quartzmehl K8 | 300 | |
| Cyanuric acid | | 130 |
| Arc resistance DIN 53484 (stage) | L4 | L4 |
| Dielectric loss factor tgδ VDE 0303 (50 c.p.s.) in percent at— | | |
| 20° C | 1.0 | 0.2 |
| 50° C | 1.8 | 0.3 |

What is claimed is:

1. A curable resin composition adapted for the manufacture of structural articles consisting essentially of cured resin having incorporated dispersed filler and having good mechanical and dielectrical properties, said composition comprising as the resin component a member selected from the group consisting of (1) a mixture of (a) an epoxy resin containing carbocyclic aromatic rings and (b) a curing agent for epoxy resins in an amount suitable to cure said compositions to an infusible product, and (2) a still soluble and fusible precondensate from the said epoxy resin (a) and the said curing agent (b), said resin composition further comprising as essential component a filler consisting at least partially of a nitrogen compound which has a molecular weight not exceeding 1000, has a melting point above 120° C. and is substantially insoluble in the resin component at 120° C. said nitrogenous compound being a member selected from the group consisting of melamine, cyanuric acid, formoguanamine acetoguanamine, benzoguanamine, guanidine, guanidine salts, dicyandiamide and urea and the said nitrogenous compound being present in the composition in an amount of at least 40 parts by weight for every 100 parts by weight of epoxy resin (a) said filler imparting a high electric arc resistance to the cured composition.

2. A resin composition according to claim 1, wherein the nitrogenous compound used as filler is present in an amount of over 50 and up to 400 parts by weight for every 100 parts by weight of epoxy resin (a).

3. A resin composition according to claim 1, containing as epoxy resin (a) a polyglycidyl ether of a polyphenol.

4. A resin composition according to claim 1, wherein a portion of the epoxy resin containing carbocyclic aromatic rings is replaced by another epoxy resin, and the nitrogenous filler is present in an amount of at least 40 parts by weight per 100 parts by weight of the total weight of epoxy resins contained in the resin composition.

References Cited

UNITED STATES PATENTS 2,722,561 11/1955 McCullock _____ 252—63.7

FOREIGN PATENTS 938,479 10/1963 Great Britain.

MORRIS LIEBMAN, Primary Examiner

L. T. JACOBS, Assistant Examiner